W. H. MARTYN.
MECHANICAL STARTING APPLIANCE FOR ENGINES.
APPLICATION FILED MAY 6, 1919.
1,309,902. Patented July 15, 1919.
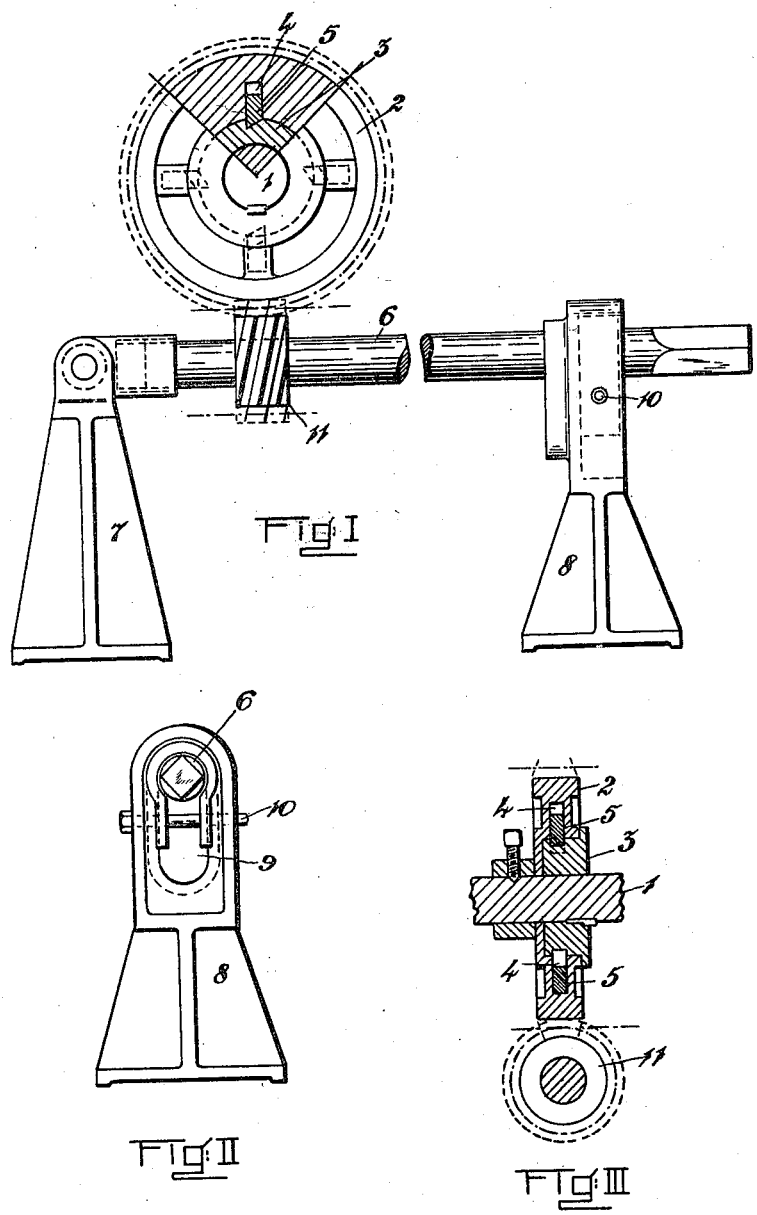

UNITED STATES PATENT OFFICE.

WILLIAM HENRY MARTYN, OF TENTERFIELD, NEW SOUTH WALES, AUSTRALIA, ASSIGNOR TO THOMAS HAMMOND MARTYN, OF SYDNEY, NEW SOUTH WALES, AUSTRALIA.

MECHANICAL STARTING APPLIANCE FOR ENGINES.

1,309,902.   Specification of Letters Patent.   Patented July 15, 1919.

Application filed May 6, 1919. Serial No. 295,214.

*To all whom it may concern:*

Be it known that I, WILLIAM HENRY MARTYN, a subject of the King of Great Britain and Ireland, residing at Cowper street, Tenterfield, State of New South Wales, Commonwealth of Australia, have invented new and useful Improvements in Mechanical Starting Appliances for Engines, of which the following is a specification.

The mechanical starting gear comprises a composite worm wheel and ratchet wheel on the crank shaft, pawls operated automatically between the worm wheel and the ratchet wheel, a worm shaft and worm preferably at right angles to the crank shaft and means for lowering the worm shaft so that the worm shall cease to mesh with the worm wheel.

In the accompanying drawings:—

Figure I is a front elevation of the worm shaft and an end elevation of the crank shaft and composite worm wheel and ratchet wheel.

Fig. II is an end elevation of the worm shaft.

Fig. III is a vertical transverse section of the composite worm wheel and ratchet wheel.

Upon the crank shaft 1 is keyed the composite worm wheel and ratchet wheel, the worm wheel being shown at 2 and the ratchet wheel at 3. The ratchet wheel 3 lies snugly within the worm wheel 2, the worm wheel being provided with internal recesses 4 to receive the pawls 5. The pawls 5 lie loosely within their respective recesses 4 and under slow conditions of rotation will act by gravity, but under conditions of a swift rotation will be acted upon by centrifugal force causing them to fly outward. It is imperative that any recess 4 should be of such a depth that the pawl 5 will be enabled to lie wholly within it. Preferably at right angles to the crank shaft is the worm shaft 6, supported on standards 7, 8, the worm shaft 6 being articulated to the standard 7 in such a way as to be susceptible to rotatory movement and to a limited movement in a vertical plane; the worm shaft 6 will pass freely through the standard 8, in which is a vertical slot 9 through which will pass a transverse pin 10, or other analogous device, for maintaining the end of the shaft 6 in its highest position. Upon the worm shaft will be keyed the worm 11, the free end of the worm shaft having a square head to receive a winch handle whereby the shaft 6 may be rotated.

When it is desired to start the engine, the winch handle and with it the worm shaft will be rotated, thus imparting rotary movement to the crank shaft 1, through the worm 11 and worm wheel 2. The pawl under the crank shaft will retire, by gravity, into its recess, while the pawl above the crank shaft will fall, by gravity, and engage with one of the teeth on the ratchet wheel 3, thus insuring that there shall be coöperation between the worm wheel, the ratchet wheel and the crank shaft. As the speed of rotation of the crank shaft increases, centrifugal force will begin to operate causing the pawls to fly out from the center, thus automatically releasing the ratchet wheel from the pawl grip of the worm wheel. The pin 10 may then be removed and the worm shaft allowed to drop so that the worm 11 shall no longer mesh with the worm wheel 2.

What I claim is:—

1. In appliances for starting engines, a composite device consisting of a box worm wheel having recesses at regular intervals the recesses having their open ends turned inward, pawls, within the recesses, each pawl being of such a length as to be capable of lying wholly within its recess, and a ratchet wheel keyed on the crank shaft and adapted to lie snugly within the worm wheel, as and for the purposes herein set forth.

2. In appliances for starting engines, a composite device consisting of a box worm wheel, a ratchet wheel inclosed therein, pawls for connecting the worm wheel with the ratchet, in combination with a worm shaft that is susceptible to a rotary movement and to a limited movement in a vertical plane, a worm upon the worm shaft such worm meshing with the worm wheel upon the crank shaft and means for disengaging the worm from the worm wheel as and for the purposes herein set forth.

3. A starting device for engines comprising a rotatable shaft, a worm wheel normally rotatable with the shaft, means for rotating the worm wheel, and means for automatically disconnecting the worm wheel from the shaft after they have reached a predetermined speed.

4. A starting device for engines comprising a rotatable shaft, a worm wheel normally rotatable with the shaft, means for rotating the worm wheel, and means responsive to the action of centrifugal force for disconnecting the wheel from the shaft after they have reached a predetermined speed.

5. A starting device for engines comprising a rotatable shaft, a worm wheel normally rotatable with the shaft, manually operable means for rotating the wheel, said means being movable to engage or disengage said wheel, means for locking said means in engaging position, and means for automatically disconnecting the wheel from the shaft after they have reached a predetermined speed.

In testimony whereof I have signed my name to this specification in the presence of two subscribing witnesses.

WILLIAM HENRY MARTYN.

Witnesses:
MANFIELD NEWTON,
GEORGE F. HANSON.

Copies of this patent may be obtained for five cents each, by addressing the "Commissioner of Patents, Washington, D. C."